(12) United States Patent
Choma

(10) Patent No.: US 8,453,839 B1
(45) Date of Patent: Jun. 4, 2013

(54) COMPACT CHEWING GUM DISPOSAL SYSTEM

(76) Inventor: Jonathan D. Choma, Palm Beach Gardens, FL (US)

( * ) Notice: Subject to any disclaimer, the term of this patent is extended or adjusted under 35 U.S.C. 154(b) by 6 days.

(21) Appl. No.: 13/316,330

(22) Filed: Dec. 9, 2011

Related U.S. Application Data

(63) Continuation-in-part of application No. 12/354,690, filed on Jan. 15, 2009, now abandoned.

(51) Int. Cl.
*B01D 24/00* (2006.01)
(52) U.S. Cl.
USPC .......................................... 206/449; 206/499
(58) Field of Classification Search
USPC ............... 206/800, 823, 449, 555; 220/254.1, 220/254.3, 323.1
See application file for complete search history.

(56) References Cited

U.S. PATENT DOCUMENTS

| | | | |
|---|---|---|---|
| 877,347 A | 1/1908 | Lazar | |
| 1,072,859 A * | 9/1913 | Kingsley | 221/59 |
| 1,543,865 A | 6/1925 | Muchmore | |
| 2,005,490 A | 6/1935 | Baxter | |
| D253,873 S | 1/1980 | Friedman et al. | |
| 4,969,575 A * | 11/1990 | Kobayashi | 221/45 |
| 5,128,157 A * | 7/1992 | Ruiz | 426/106 |
| 5,836,862 A | 11/1998 | Granger | |
| 6,164,442 A * | 12/2000 | Stravitz | 206/233 |
| 7,802,696 B2 * | 9/2010 | Moore | 221/59 |
| 2003/0150766 A1 * | 8/2003 | Smith | 206/527 |
| 2004/0173475 A1 | 9/2004 | Shimko | |
| 2006/0051457 A1 | 3/2006 | Bougoulas et al. | |
| 2006/0237355 A1 * | 10/2006 | Knapp | 210/323.1 |
| 2008/0041851 A1 * | 2/2008 | Thrapp | 220/229 |
| 2008/0302696 A1 * | 12/2008 | Moore | 206/555 |

* cited by examiner

*Primary Examiner* — Steven A. Reynolds
*Assistant Examiner* — King M Chu

(57) ABSTRACT

A compact and portable chewing gum disposal system for sanitary and responsible disposal of a chewing gum cud. The system has a generally cylindrically-shaped hollow container that has a hollow top member with a circular orifice on a top surface and a lid pivotally attached that fully covers the orifice. The hollow container also has a hollow bottom member that is sized to snuggly slide into and attach to the hollow top member. The hollow container has a fluted disposal wrap stack, consisting of a plurality of fluted disposal wraps, located inside with the circular bottom surface of the fluted disposal wraps facing upward. The top surface and a rim around the orifice retain the fluted disposal wrap stack inside the hollow container when the lid is in a first open position. The fluted disposal wrap stack is compacted by moving the lid into a second closed position.

16 Claims, 4 Drawing Sheets

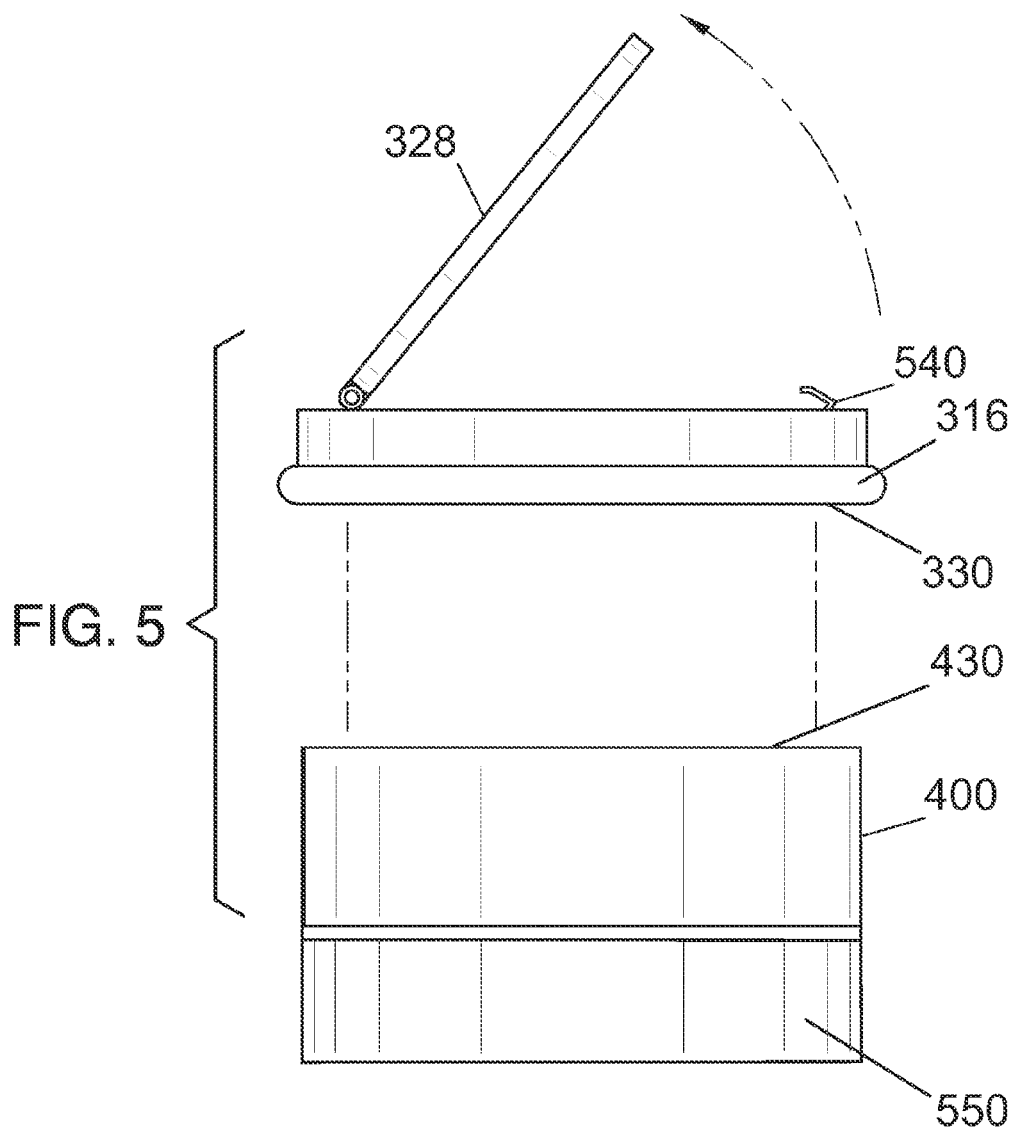

COMPACT CHEWING GUM DISPOSAL SYSTEM

CROSS REFERENCE

This application claims priority to U.S. nonprovisional application Ser. No. 12/354,690 filed Jan. 15, 2009, the specification of which is incorporated herein by reference in its entirety.

BACKGROUND OF THE INVENTION

Chewing gum in various forms has existed for several thousand years with early forms of commercially sold chewing gum appearing in the mid 1800's. Despite its long-standing popularity, many schools, theme parks, airports, and cities have bans in place resulting from improper disposal of the remaining chewing gum cud. Often, chewing gum has been found stuck underneath benches, chairs, and tables, or it has been discarded onto the surface of sidewalks, floors, and streets. Further, chewing gum is resistant to decomposition making it a nuisance and a hazard to the environment. The present invention addresses the issue by providing a convenient means for sanitary and responsible disposal of the chewing gum cud.

SUMMARY

The present invention features a compact and portable chewing gum disposal system for sanitary and responsible disposal of a chewing gum cud. In some embodiments, the system has a generally cylindrically shaped hollow container. In some embodiments; the hollow container has a hollow top member with a circular orifice located on a top surface and a circular lid pivotally attached that fully covers the circular orifice. The hollow top member has a full-cross sectional opening located at a bottom. In some embodiments, the hollow container has a hollow bottom member having a full cross-sectional opening located at a top where an inner surface of a top member side wall is sized to snuggly slide over and attach to an outer surface of a bottom member side wall.

In some embodiments, the hollow container has a fluted disposal wrap stack, consisting of a plurality of fluted disposal wraps, located inside with the circular bottom surface of the fluted disposal wraps facing upward. In some embodiments, the top surface and a rim around the circular orifice retain the fluted disposal wrap stack inside the hollow container when the circular lid is in a first open position. In some embodiments, the fluted disposal wrap stack is compacted by moving the circular lid into a second closed position. Upon moving the circular lid into the first open position, the fluted disposal wrap stack springs upward, where a first fluted disposal wrap can be removed from the fluted disposal wrap stack located inside the hollow container, wrapped about a chewing gum cud, then disposed of in a waste receptacle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 5 is an exploded side view of an alternate embodiment of the present invention.

DESCRIPTION OF PREFERRED EMBODIMENTS

Figure 1:
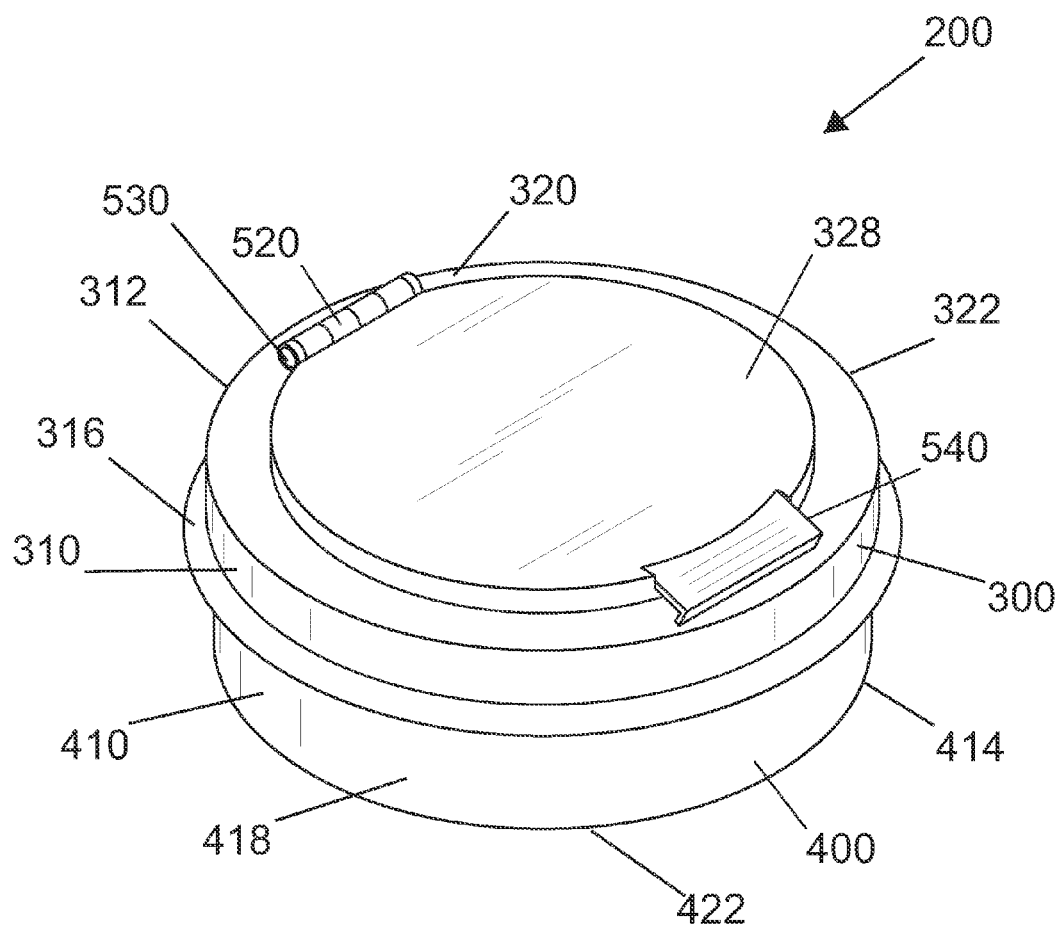
FIG. 1 is a perspective view of the top and side of the present invention.
Figure 2:
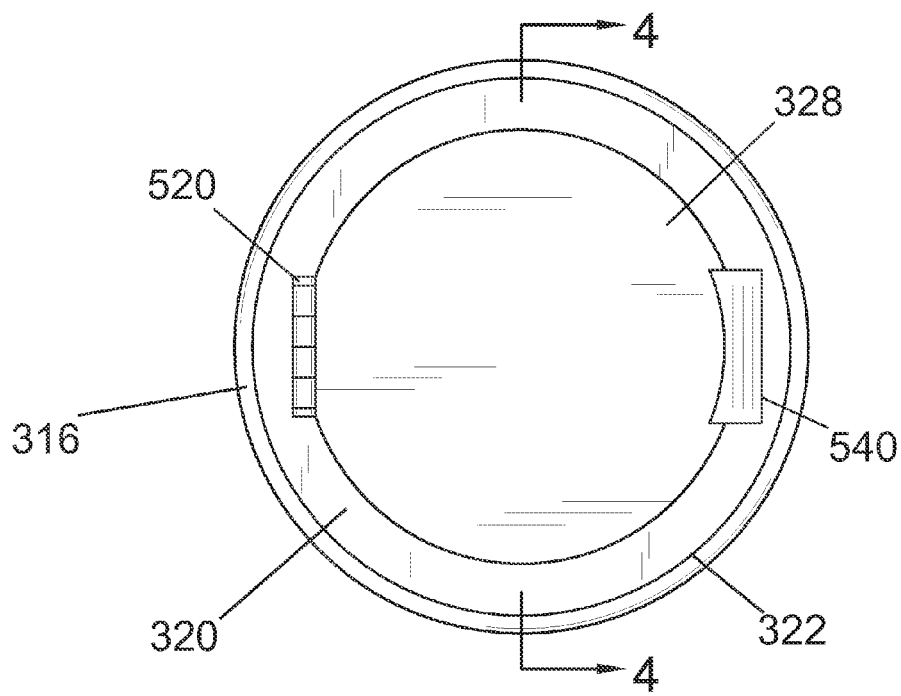
FIG. 2 is a top view of the present invention.
Figure 3:
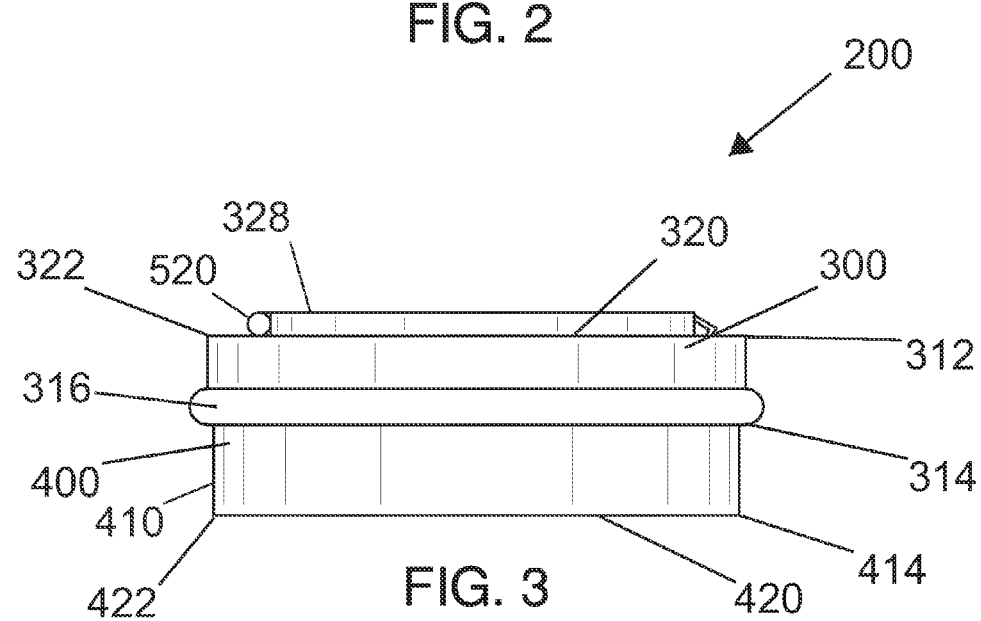
FIG. 3 is a side view of the present invention.
Figure 4A:
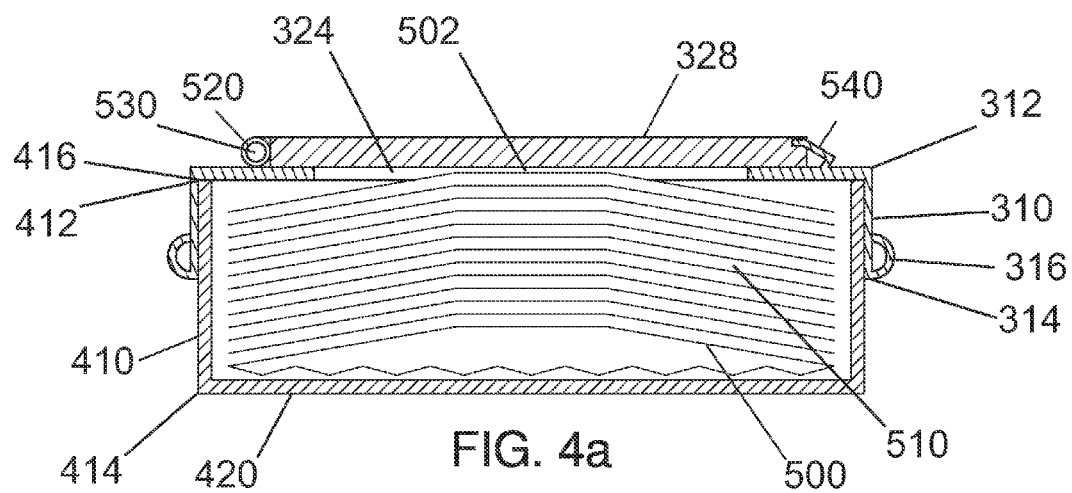
FIG. 4a is a cross-sectional view of a closed lid of the present invention.
Figure 4B:
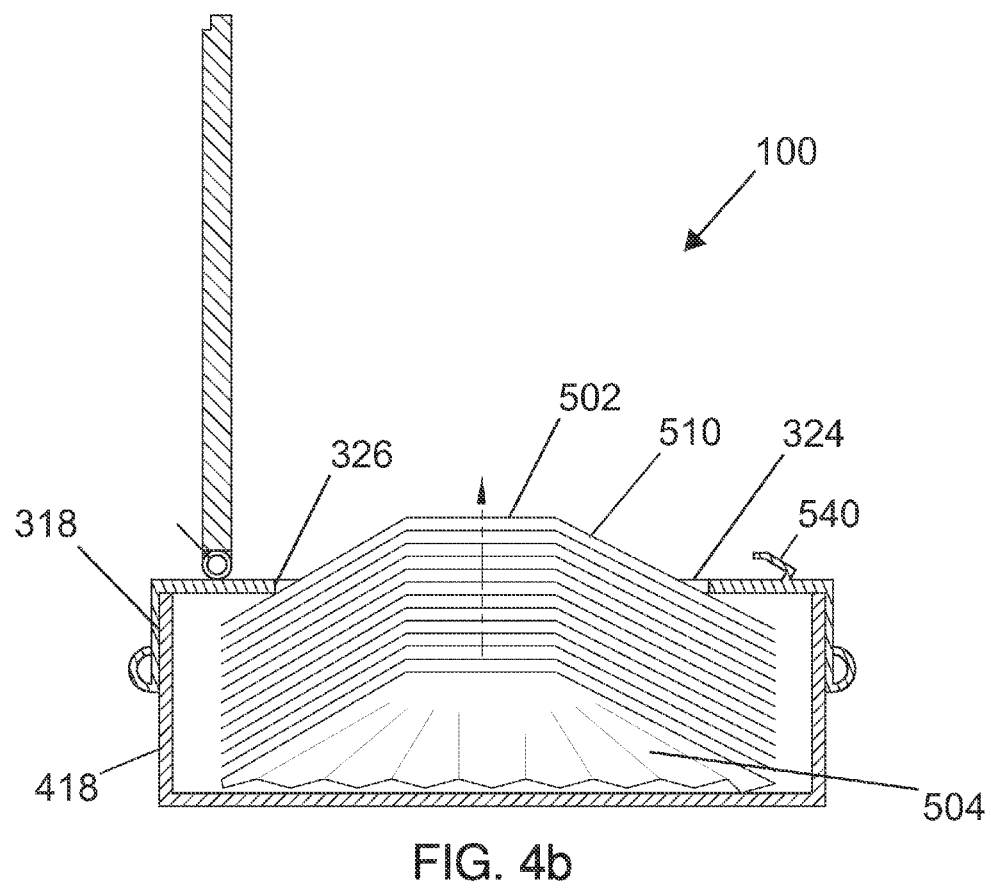
FIG. 4b is a cross-sectional view of an open lid of the present invention.

Following is a list of elements corresponding to a particular element referred to herein:
  100 Chewing gum disposal system
  200 Hollow container
  300 Top member
  310 Top member side wall
  312 Top member side wall upper edge
  314 Top member side wall lower edge
  316 Top member lower lip
  318 Top member side wall interior surface
  320 Top member top surface
  322 Top member outer edge
  324 Top member circular orifice
  326 Top member circular rim
  328 Top member circular lid
  330 Top member opening
  400 Bottom member
  410 Bottom member side wall
  412 Bottom member side wall upper edge
  414 Bottom member side wall lower edge
  416 Bottom member upper lip
  418 Bottom member side wall exterior surface
  420 Bottom member bottom surface
  422 Bottom member outer edge
  430 Bottom member opening
  500 Fluted disposal wrap
  502 Disposal wrap bottom surface
  504 Disposal wrap fluted side wall
  510 Fluted disposal wrap stack
  520 Hinge
  530 Spring
  540 Latch
  550 Unused gum cavity Referring now to FIGS. 1-5 the present invention features a compact and portable chewing gum disposal system (100) for sanitary and responsible disposal of a chewing gum cud.

In some embodiments, the system (100) has a generally cylindrically-shaped hollow container (200). The hollow container (200) has a generally cylindrically-shaped hollow top member (300) and a generally cylindrically-shaped hollow bottom member (400).

In some embodiments, the top member (300) has a generally cylindrical top member side wall (310) with a top member lower lip (316) located on a top member side wall lower edge (314). In some embodiments, the top member (300) further has a generally circular top member top surface (320) with a top member outer edge (322) that fully intersects a top member side wall upper edge (312).

In some embodiments, the top member top surface (320) has a top member circular orifice (324) located in a center of the top member top surface (320). In some embodiments, the top member top surface (320) further has a top member circular rim (326) that borders a periphery of the top member circular orifice (324).

In some embodiments, a top member circular lid (328) pivotally attaches on an edge to the top member top surface (320), and fully covers the top member circular orifice (324) with a periphery extending beyond the periphery of the top member circular orifice (324). In some embodiments, the top member circular lid (328) is movable to a first open position and a second closed position.

In some embodiments, the top member circular lid (328) comprises a cylindrical skirt around the periphery. In some embodiments, the top member circular lid (328) is embossed.

In some embodiments, a generally circular top member opening (330) is located at the top member side wall lower edge (314).

In some embodiments, a generally cylindrically-shaped hollow bottom member (400) has a generally cylindrical bottom member side wall (410) with a bottom member upper lip (416) located on a bottom member side wall upper edge (412). In some embodiments, the bottom member (400) further has a generally circular bottom member bottom surface (420) with a bottom member outer edge (422) that fully intersects a bottom member side wall lower edge (414).

In some embodiments, a generally circular bottom member opening (430) is located at the bottom member side wall upper edge (412). In some embodiments, a top member side wall interior surface (318) is sized to snuggly slide over and attach to a bottom member side wall exterior surface (418).

In some embodiments, the system (100) further has a plurality of fluted disposal wraps (500) located in the hollow container (200). In some embodiments, the fluted disposal wrap (500) has a circular disposal wrap bottom surface (502) and a cylindrical disposal wrap fluted side wall (504) that fully intersects a bottom edge of the disposal wrap bottom surface (502). In some embodiments, the fluted disposal wraps (500) are stackable in a fluted disposal wrap stack (510) that has a height that is compressible, and a periphery that expands upon compressing the height of the fluted disposal wrap stack (510).

In some embodiments, the hollow container (200) has a fluted disposal wrap stack (510) located inside. In some embodiments, the fluted disposal wrap stack (510) is located with the disposal wrap bottom surface (502) facing upward. In some embodiments, the top member top surface (320) and the top member circular rim (326) retain the fluted disposal wrap stack (510) inside the hollow container (200) when the top member circular lid (328) is in the first open position. In some embodiments, the fluted disposal wrap stack (510) is compacted by moving the top member circular lid (328) into the second closed position.

In some embodiments, upon moving the top member circular lid (328) into the first open position, the fluted disposal wrap stack (510) springs upward. In some embodiments, a first fluted disposal wrap (500) can be removed from the fluted disposal wrap stack (510) located inside the hollow container (200), wrapped about a chewing gum cud, then disposed of in a waste receptacle.

In some embodiments, a hinge (520) located on the top member circular lid (328) is further located on the top member top surface (320), pivotally attaching the top member circular lid (328) to the top member top surface (320).

In some embodiments, a spring (530) is located on the top member circular lid (328), where the spring (530) supplies a compressive force to move the top member circular lid (328) into the first open position.

In some embodiments, a latch (540) is located on the top member circular lid (328), where the latch (540) attachably affixes the top member circular lid (328) into a second closed position, wherein, when activated, the latch (540) releases the top member circular lid (328) into a first open position.

In some embodiments, the hollow container (200) is constructed from a metal. In some embodiments the hollow container (200) is constructed from a plastic. In some embodiments, the hollow container (200) is constructed from a paper or a paper product. In some embodiments, the hollow container (200) is biodegradable.

In some embodiments, the fluted disposal wraps (500) are constructed from a paper or a paper product. In some embodiments, the fluted disposal wraps (500) are constructed from a metal, for example, an aluminum foil. In some embodiments, the fluted disposal wraps (500) are constructed from a plastic.

In some embodiments, the fluted disposal wraps (500) are coated with a non-stick coating. In some embodiments, the fluted disposal wraps (500) are coated with a chewing gum dissolving compound.

In some embodiments, the fluted disposal wraps (500) are biodegradable.

In some embodiments, an unused gum cavity (550) is located beneath the bottom member (400), the unused gum cavity (550) has new, unused gum pieces located therein.

In some embodiments, the hollow container (200) is refillable with a disposal wrap stack (510).

As used herein, the term "about" refers to plus or minus 10% of the referenced number. For example, an embodiment wherein the device is about 5 inches in diameter includes a device that is between 4.5 and 5.5 inches in diameter.

The disclosures of the following U.S. Patents are incorporated in their entirety by reference herein: U.S. Patent Publication No. 2006/0051457 A1.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A compact and portable chewing gum disposal system (100) for sanitary and responsible disposal of a chewing gum cud comprising:
   (a) a generally cylindrically-shaped hollow container (200) comprising:
      (i) a generally cylindrically-shaped hollow top member (300) having a generally cylindrical top member side wall (310) having a top member lower lip (316) disposed on a top member side wall lower edge (314), a generally circular top member top surface (320) having a top member outer edge (322) that fully intersects a top member side wall upper edge (312), said top member top surface (320) comprises a top member circular orifice (324) disposed in a center of the top member top surface (320), said top member top surface (320) further comprises a top member circular rim (326) that borders a periphery of the top member circular orifice (324), a top member circular lid (328)

pivotally attached on an edge to the top member top surface (320), said top member circular lid (328) fully covers the top member circular orifice (324) having a periphery extending beyond the periphery of the top member circular orifice (324), said top member circular lid (328) is movable to a first open position and a second closed position, and a generally circular top member opening (330) disposed at the top member side wall lower edge (314), (ii) a generally cylindrically-shaped hollow bottom member (400) having a generally cylindrical bottom member side wall (410) having a bottom member upper lip (416) disposed on a bottom member side wall upper edge (412), a generally circular bottom member bottom surface (420) having a bottom member outer edge (422) that fully intersects a bottom member side wall lower edge (414), and a generally circular bottom member opening (430) disposed at the bottom member side wall upper edge (412), wherein a top member side wall interior surface (318) is sized to snuggly slide over and attach to a bottom member side wall exterior surface (418);

(b) a plurality of fluted disposal wraps (500) disposed in the hollow container (200) having a circular disposal wrap bottom surface (502) and a cylindrical disposal wrap fluted side wall (504) that fully intersects a bottom edge of the disposal wrap bottom surface (502), said fluted disposal wraps (500) are stackable in a fluted disposal wrap stack (510), said fluted disposal wrap stack (510) having a height that is compressible, said fluted disposal wrap stack (510) having a periphery that expands upon compressing the height of the fluted disposal wrap stack (510), wherein the hollow container (200) comprises a fluted disposal wrap stack (510) disposed therein, wherein the fluted disposal wrap stack (510) is disposed with the disposal wrap bottom surface (502) facing upward, wherein the top member top surface (320) and the top member circular rim (326) retain the fluted disposal wrap stack (510) inside the hollow container (200) when the top member circular lid (328) is in the first open position, wherein the fluted disposal wrap stack (510) is compacted by moving the top member circular lid (328) into the second closed position, wherein, upon moving the top member circular lid (328) into the first open position, the fluted disposal wrap stack (510) springs upward, wherein a first fluted disposal wrap (500) can be removed from the fluted disposal wrap stack (510) disposed inside the hollow container (200), wrapped about a chewing gum cud, then disposed of in a waste receptacle.

2. The system (100) of claim 1, wherein a hinge (520) is disposed on the top member circular lid (328) and further disposed on the top member top surface (320), pivotally attaching the top member circular lid (328) to the top member top surface (320).

3. The system (100) of claim 1, wherein a spring (530) is disposed on the top member circular lid (328), wherein the spring (530) supplies a compressive force to move the top member circular lid (328) into the first open position.

4. The system (100) of claim 1, wherein a latch (540) is disposed on the top member circular lid (328), wherein the latch (540) attachably affixes the top member circular lid (328) into a second closed position, wherein, when activated, the latch (540) releases the top member circular lid (328) into a first open position.

5. The system (100) of claim 1, wherein the hollow container (200) is constructed from a metal.

6. The system (100) of claim 1, wherein the hollow container (200) is constructed from a plastic.

7. The system (100) of claim 1, wherein the hollow container (200) is constructed from a paper or a paper product.

8. The system (100) of claim 1, wherein the hollow container (200) is biodegradable.

9. The system (100) of claim 1, wherein the fluted disposal wraps (500) are constructed from a paper or a paper product.

10. The system (100) of claim 1, wherein the fluted disposal wraps (500) are constructed from a metal.

11. The system (100) of claim 1, wherein the fluted disposal wraps (500) are constructed from a plastic.

12. The system (100) of claim 1, wherein the fluted disposal wraps (500) are coated with a non-stick coating.

13. The system (100) of claim 1, wherein the fluted disposal wraps (500) are coated with a chewing gum dissolving compound.

14. The system (100) of claim 1, wherein the fluted disposal wraps (500) are biodegradable.

15. The system (100) of claim 1, wherein an unused gum cavity (550) is disposed beneath the bottom member (400), said unused gum cavity (550) having new, unused gum pieces disposed therein.

16. The system (100) of claim 1, wherein the hollow container (200) is refillable with a disposal wrap stack (510).

* * * * *